(12) United States Patent
Lian et al.

(10) Patent No.: US 11,750,879 B2
(45) Date of Patent: Sep. 5, 2023

(54) VIDEO CONTENT DISPLAY METHOD, CLIENT, AND STORAGE MEDIUM

(71) Applicant: BEIJING BYTEDANCE NETWORK TECHNOLOGY CO., LTD., Beijing (CN)

(72) Inventors: Weiqin Lian, Beijing (CN); You Tu, Beijing (CN); Hongji Song, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/706,536

(22) Filed: Mar. 28, 2022

(65) Prior Publication Data

US 2022/0224978 A1    Jul. 14, 2022

Related U.S. Application Data

(63) Continuation of application No. PCT/CN2020/110582, filed on Aug. 21, 2020.

(30) Foreign Application Priority Data

Sep. 26, 2019    (CN) .......................... 201910919403.9

(51) Int. Cl.
*H04N 21/44*    (2011.01)
*H04N 21/472*    (2011.01)
*H04N 21/81*    (2011.01)

(52) U.S. Cl.
CPC ..... *H04N 21/44016* (2013.01); *H04N 21/472* (2013.01); *H04N 21/812* (2013.01)

(58) Field of Classification Search
CPC ........... H04N 21/44016; H04N 21/472; H04N 21/812
(Continued)

(56) References Cited

U.S. PATENT DOCUMENTS

| 6,698,020 | B1 | 2/2004 | Zigmond et al. |
| 9,380,332 | B1 * | 6/2016 | Mills .................... H04N 21/812 |

(Continued)

FOREIGN PATENT DOCUMENTS

| CN | 101480053 A | 7/2009 |
| CN | 201491151 U | 5/2010 |

(Continued)

OTHER PUBLICATIONS

International Patent Application No. PCT/CN2020/110582; Int'l Written Opinion and Search Report; dated Nov. 11, 2020; 5 pages.

*Primary Examiner* — Cynthia M Fogg
(74) *Attorney, Agent, or Firm* — BakerHostetler

(57) ABSTRACT

Embodiments of the present invention provide a video content display method, a client, and a storage medium. The video content display method comprises: upon receipt of a startup instruction, measuring the current state parameter; if the current state parameter meets a preset display condition, reading pre-loaded video data, the preset display condition being used for determining whether to display the video content to be displayed of the pre-loaded video data; embedding the pre-loaded video data into the current information flow to obtain an information flow to be displayed; and in response to the startup instruction, playing back a target video corresponding to the information flow to be displayed to realize the display of said video content.

17 Claims, 8 Drawing Sheets

(58) Field of Classification Search
USPC .......................................................... 725/32
See application file for complete search history.

(56) References Cited

U.S. PATENT DOCUMENTS

| | | | |
|---|---|---|---|
| 11,062,358 B1* | 7/2021 | Lewis | G06Q 30/0277 |
| 2001/0044832 A1* | 11/2001 | Cohn | H04L 9/40 |
| | | | 709/227 |
| 2002/0129375 A1* | 9/2002 | Kim | H04N 21/8549 |
| | | | 348/E5.103 |
| 2004/0194142 A1* | 9/2004 | Jiang | H04N 21/44004 |
| | | | 375/E7.014 |
| 2008/0119133 A1* | 5/2008 | Rao | H04L 67/55 |
| | | | 705/14.73 |
| 2008/0276269 A1 | 11/2008 | Miller et al. | |
| 2009/0198580 A1* | 8/2009 | Broberg | G06Q 30/02 |
| | | | 705/14.1 |
| 2010/0223129 A1 | 9/2010 | Harmon | |
| 2014/0033248 A1* | 1/2014 | Aftelak | H04H 60/31 |
| | | | 705/14.1 |
| 2014/0282281 A1* | 9/2014 | Ram | G06F 16/41 |
| | | | 715/863 |
| 2015/0325268 A1* | 11/2015 | Berger | H04N 21/4335 |
| | | | 386/248 |
| 2016/0007077 A1 | 1/2016 | Hoffert et al. | |
| 2016/0334973 A1* | 11/2016 | Reckhow | H04N 21/4312 |
| 2017/0295410 A1* | 10/2017 | Bloch | H04N 21/812 |
| 2022/0021941 A1* | 1/2022 | Mitchard | G06F 3/04883 |
| 2022/0291934 A1* | 9/2022 | Mo | G06F 9/451 |

FOREIGN PATENT DOCUMENTS

| | | |
|---|---|---|
| CN | 101796536 A | 8/2010 |
| CN | 101884217 A | 11/2010 |
| CN | 105791887 A | 7/2016 |
| CN | 106101846 A | 11/2016 |
| CN | 107666616 A | 2/2018 |
| JP | 2002-518946 A | 6/2002 |
| JP | 2002-344399 A | 11/2002 |
| JP | 2005-252576 A | 9/2005 |
| JP | 2010-526497 A | 7/2010 |
| JP | 2010-171713 A | 8/2010 |
| JP | 2011-142605 A | 7/2011 |
| JP | 2015-106917 A | 6/2015 |
| JP | 2015-109072 A | 6/2015 |
| JP | 2018-197828 A | 12/2018 |
| JP | 2019-125889 A | 7/2019 |

* cited by examiner

VIDEO CONTENT DISPLAY METHOD, CLIENT, AND STORAGE MEDIUM

CROSS REFERENCE OF RELATED APPLICATION

The present application is a continuation application of PCT international patent application PCT/CN2020/110582, filed on Aug. 21, 2020, which claims priority to Chinese Patent Application No. 201910919403.9, titled "VIDEO CONTENT DISPLAY METHOD, CLIENT, AND STORAGE MEDIUM", filed on Sep. 26, 2019, with the China National Intellectual Property Administration, both of which are incorporated herein by reference in their entireties.

FIELD

Embodiments of the present disclosure relate to a native splash advertisement delivery technology in the field of application programs, and in particular to a method for displaying video content, a client, and a storage medium.

BACKGROUND

With the development of smart hardware and mobile Internet technology, terminals, such as smart phones, tablet computers and smart watches, become increasingly popular in work and daily life. Information are increasingly acquired through client applications on terminals. Correspondingly, there is an increasing trend for advertisers to place a splash advertisement on these client applications. The splash advertisement is displayed directly when the client application is opened. This display manner of splash advertisements plays a good role in advertising, is one of the most popular advertising forms by advertisers, and is also a commonly used commercial monetization way for client applications.

Due to the use of splash advertisements in increasing client applications, improving the promotion effect of the video content to be displayed and improving the fluency of the video content to be displayed have gradually become optimization goals for displaying the video content to be displayed.

SUMMARY

In view of this, a method for displaying video content, a client, and a storage medium are provided according to embodiments of the present disclosure.

In a first aspect, a method for displaying video content is provided according to an embodiment of the present disclosure. The method includes: detecting a current state parameter when receiving a starting instruction; reading preloaded video data if the current state parameter meets a preset display condition, where the preset display condition is used to determine whether to display the video content to be displayed corresponding to the preloaded video data; embedding the preloaded video data into a current information stream to obtain information stream to be displayed; and playing, in response to the starting instruction, a target video corresponding to the information stream to be displayed, to display the video content.

In the above solution, the target video includes: a video to be displayed corresponding to the preloaded video data, and a natural information stream video corresponding to the current information stream.

In the above solution, before the playing a target video corresponding to the information stream to be displayed, the method further includes: acquiring a pre-stored simulation starting image and/or a pre-stored simulation starting video when receiving the starting instruction; and displaying the pre-stored simulation starting image and/or the pre-stored simulation starting video in response to the starting instruction.

In the above solution, the playing a target video corresponding to the information stream to be displayed includes: removing the pre-stored simulation starting image and/or the pre-stored simulation starting video; playing the video to be displayed, and receiving a control instruction corresponding to the video to be displayed; and playing the natural information stream video based on the control instruction.

In the above solution, the control instruction includes: viewing, switching or continuous playing.

In the above solution, in a case that the control instruction is viewing, the playing the natural information stream video based on the control instruction includes: in response to the control instruction, performing viewing processing according to a pre-stored content address corresponding to the video content to be displayed; receiving a closing instruction corresponding to the pre-stored content address; and playing the natural information stream video in response to the closing instruction.

In the above solution, in a case that the control instruction is switching, the playing the natural information stream video based on the control instruction includes: in response to the control instruction, closing the video to be displayed and switching to the natural information stream video.

In the above solution, in a case that the control instruction is continuous playing, the playing the natural information stream video based on the control instruction includes: displaying the natural information stream video in response to the control instruction after displaying the video to be displayed.

In the above solution, after the playing the natural information stream video based on the control instruction, the method further includes: receiving a return instruction corresponding to the natural information stream video; and in response to the return instruction, closing the natural information stream video and switching to the video to be displayed.

In the above solution, the playing of the video to be displayed includes: displaying the video to be displayed according to a preset time parameter, a preset component configuration, and a preset animation effect.

In the above solution, before the reading preloaded video data, the method further includes: acquiring a preload task corresponding to the video content to be displayed, where the preload task carries a preloading strategy, and the preloading strategy is used to limit a preset network parameter and a preset data parameter on the video content to be displayed; and requesting the preloaded video data and caching the preloaded video data according to the preset network parameter and the preset data parameter.

In a second aspect, a client is provided according to an embodiment of the present disclosure. The client includes: a detecting unit, a reading unit, an acquiring unit and a playing unit. The reading unit is configured to read preloaded video data if a current state parameter meets a preset display condition. The preset display condition is used to determine whether to display the video content to be displayed corresponding to the preloaded video data. The acquiring unit is configured to embed the preloaded video data into a current information stream to obtain an information stream to be displayed. The playing unit is configured to play the target video corresponding to the information stream to be displayed in response to a starting instruction, so as to display the video content.

In the above solution, the target video includes: a video to be displayed corresponding to the preloaded video data, and a natural information stream video corresponding to the current information stream.

In the above solution, the client further includes: a displaying unit. The acquiring unit is further configured to acquire a pre-stored simulation starting image and/or a pre-stored simulation starting video after the starting instruction is received and before the target video corresponding to the information stream to be displayed is played. The displaying unit is configured to display the pre-stored simulation starting image and/or the pre-stored simulation starting video in response to the starting instruction.

In the above solution, the playing unit is further configured to: remove the pre-stored simulation starting image and/or the pre-stored simulation starting video; play the video to be displayed, and receive a control instruction corresponding to the video to be displayed; and play the natural information stream video based on the control instruction.

In the above solution, the control instruction includes: viewing, switching or continuous playing. The playing unit is further configured to: in a case that the control instruction is viewing, in response to the control instruction, perform viewing processing according to a pre-stored content address corresponding to the video content to be displayed; receive a closing instruction corresponding to the pre-stored content address; and play the natural information stream video in response to the closing instruction. The playing unit is further configured to: in a case that the control instruction is switching, close the video to be displayed and switch to the natural information stream video in response to the control instruction. The playing unit is further configured to: in a case that the control instruction is continuous playing, display the natural information stream video in response to the control instruction after the video to be displayed is displayed.

In the above solution, the client further includes: a receiving unit. The receiving unit is configured to, based on the control instruction, receive a return instruction corresponding to the natural information stream video after the natural information stream video is played. The playing unit is further configured to close the natural information stream video and switch to the video to be displayed in response to the return instruction. The playing unit is further configured to display the video to be displayed according to a preset time parameter, a preset component configuration and a preset animation effect.

In the above solution, the client further includes: a request caching unit. The acquiring unit is further configured to, before the preloaded video data is read, acquire a preload task corresponding to the video content to be displayed. The preload task carries a preloading strategy, and the preloading strategy is used to limit a preset network parameter and a preset data parameter on the video content to be displayed. The request caching unit is configured to request and cache the preloaded video data according to the preset network parameter and the preset data parameter.

In a third aspect, a client is provided according to an embodiment of the present disclosure. The client includes a processor, and a memory storing instructions executable by the processor. The processor is configured to, when executing the instructions, implement the method for displaying video content according to the embodiments of the present disclosure.

In a fourth aspect, a storage medium is provided according to an embodiment of the present disclosure. The storage medium stores a program and is applied to the client. When the program is executed by a processor, the method displaying video content according to the embodiments of the present disclosure is implemented.

A method for displaying video content, a client, and a storage medium are provided according to embodiments of the present disclosure. The client detects the current state parameter when receiving a starting instruction; reads the preloaded video data if the current state parameter meets a preset display condition, where the preset display condition is used to determine whether to display the video content to be displayed corresponding to the preloaded video data; embeds the preloaded video data into the current information stream to obtain the information stream to be displayed; and plays, in response to the starting instruction, the target video corresponding to the information stream to be displayed, to display the video content. That is, in the embodiments of the present disclosure, after determining that the current state parameter meets the preset display condition, the client embeds the preloaded video data corresponding to the video content to be displayed into the current information stream to obtain the information stream to be displayed, thereby displaying the video content to be displayed by playing the target video corresponding to the information stream to be displayed. It can be seen that the information stream to be displayed is obtained by the client embedding the preloaded video data into the current information stream, that is, the video content to be displayed is a part of the information stream. Therefore, when the client displays the video content to be displayed by playing the target video, seamless splicing of a splash stage and an information stream stage is achieved, and smooth transition between the video to be displayed and the natural information stream video is achieved, thereby improving the promotion effect of the video content to be displayed and the fluency of the video content to be displayed.

DETAILED DESCRIPTION OF EMBODIMENTS

The present disclosure is further described in detail below with reference to the accompanying drawings, so that the objectives, technical solutions and advantages of the present disclosure are clearer. The described embodiments should not be construed as limiting the present disclosure. All other embodiments obtained by those skilled in the art without creative efforts fall within the protection scope of the present disclosure.

In the following description, reference is made to "some embodiments," which describes a subset of all possible embodiments. It should be understood, however, that "some embodiments" may be the same or a different subset of all possible embodiments, and may be combined without conflict.

Figure 1:
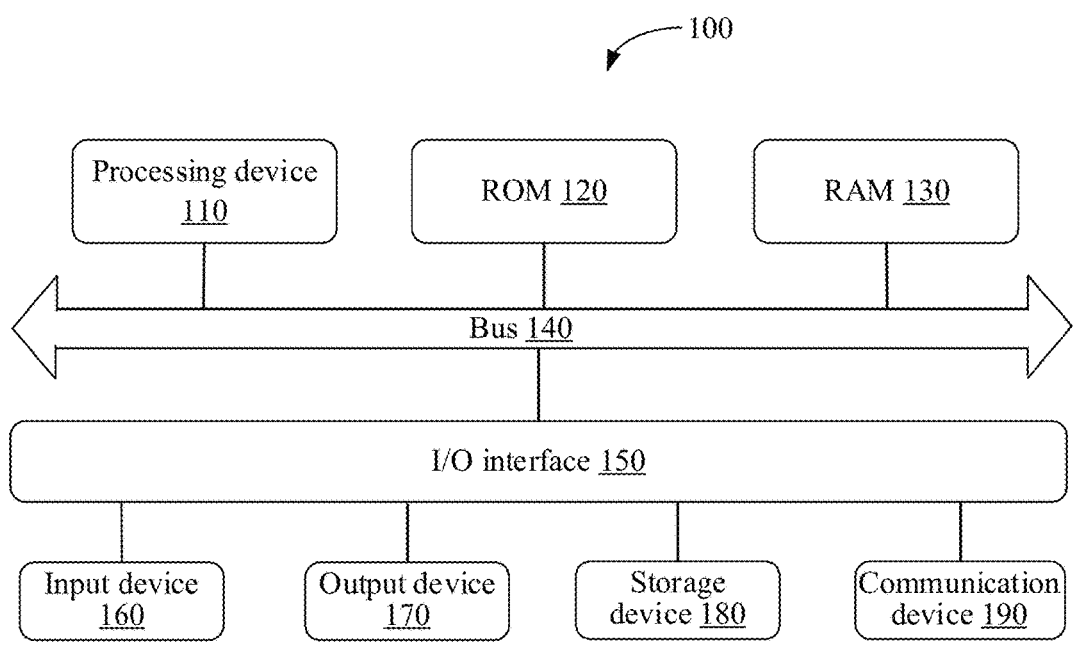
FIG. 1 is a schematic structural diagram of a terminal according to an embodiment of the present disclosure.

In the present disclosure, a client is software that can be run in a terminal. Reference is made to FIG. 1 below, which is a schematic structural diagram showing a terminal according to an embodiment of the present disclosure. As shown in FIG. 1, the terminal may be various electronic devices, including but not limited to mobile electronic devices such as mobile phones, notebook computers, digital broadcast receivers, personal digital assistants (PDA), tablet computers (PAD), portable multimedia players (PMP), in-vehicle electronic devices (for example, an in-vehicle navigation electronic device), and fixed electronic devices such as digital televisions (TVs), and desktop computers. The terminal shown in FIG. 1 is only an example, and should not impose any limitations on the functions and scope of use of the embodiments of the present disclosure.

As shown in FIG. 1, the terminal 100 may include a processing device (for example, a central processing unit or a graphics processing unit) 110. The processing device 110 performs various appropriate operations and processing according to a program stored in a read only memory (ROM) 120 or a program loaded from a storage device 180 into a random-access memory (RAM) 130. In the RAM 130, various programs and data necessary for the operation of the terminal 100 are also stored. The processing device 110, the ROM 120, and the RAM 130 are connected to each other through a bus 140. An input/output (I/O) interface 150 is also connected to the bus 140.

Generally, the following devices may be connected to the I/O interface 150: an input device 160 including, for example, a touch screen, a touch pad, a keyboard, a mouse, a camera, a microphone, an accelerometer and a gyroscope; an output device 170 including, for example, a liquid crystal display (LCD), a speaker and a vibrator; a storage device 180 including, for example, a tape and a hard disk; and a communication device 190. The communication device 190 may allow the terminal 100 to perform wireless or wired communication with other device to exchange data. Although FIG. 1 shows the terminal 100 including various devices, it should be understood that not all of the illustrated devices are to be implemented or equipped. More or fewer devices may alternatively be implemented or provided.

According to embodiments of the present disclosure, the processes illustrated in flowcharts may be implemented as a computer software program. For example, a computer program product is provided according to embodiments of the present disclosure. The computer program product includes a computer program carried on a computer readable medium. The computer program includes program code for performing the methods shown in the flowcharts. In such embodiments, the computer program may be downloaded and installed from the network via the communication device 190, or installed from the storage device 180, or installed from the ROM 120. When the computer program is executed by the processing device 110, functions in the method of the embodiments of the present disclosure are performed.

It should be noted that, the computer-readable medium described above in the embodiment of the present disclosure may be a computer-readable signal medium or a computer-readable storage medium, or a combination of the computer-readable signal medium and the computer-readable storage medium. The computer-readable storage medium may include, but is not limited to, electrical, magnetic, optical, electromagnetic, infrared, or semiconductor systems, apparatuses, or devices, or a combination thereof, for example. Examples of the computer readable storage medium may include, but are not limited to, an electrical connection with one or more wires, a portable computer disk, a hard disk, a RAM, a ROM, an erasable programmable read only memory (EPROM), a flash memory, an optical fiber, a portable compact disk read only memory (CD-ROM), an optical storage device, a magnetic storage device, or a suitable combination of the foregoing.

In the embodiments of the present disclosure, the computer-readable storage medium may be any tangible medium that contains or stores a program that can be used by or in conjunction with an instruction execution system, apparatus, or device. However, the computer-readable signal medium may include a data signal in a baseband or propagated as part of a carrier wave, carrying computer-readable program code therein. The data signal propagated in this way may be in a variety of forms, including but not limited to an electromagnetic signal, an optical signal, or a suitable combination of the foregoing. The computer-readable signal medium may be a computer-readable medium other than the computer-readable storage medium. The computer-readable signal medium is capable of transmitting, propagating, or transporting a program for use by or in connection with the instruction execution system, apparatus, or device. The program code embodied on the computer readable medium may be transmitted by any suitable medium, including but not limited to: a wire, an optical cable, radio frequency (RF) or a suitable combination of the above.

The above computer-readable medium may be included in the terminal 100, or may exist independently without being assembled into the terminal 100.

The above computer-readable medium carries one or more programs. When the one or more programs are executed by the terminal, the terminal 100 performs the method according to the embodiments of the present disclosure.

The computer program code for carrying out operations of the present disclosure may be written in one or more programming languages, or a combination thereof. The one or more programming languages include object-oriented programming languages, such as Java, Smalltalk, C++, and conventional procedural programming languages, such as the "C" language or similar programming languages. The program code may be executed entirely on the user computer, partly on the user computer, as a stand-alone software package, partly on the user computer and partly on a remote computer, or entirely on the remote computer or a server. In the case of a remote computer, the remote computer may be connected to the user computer through any kind of network, including a Local Area Network (LAN) and a Wide Area Network (WAN), or may be connected to an external computer (for example, via the Internet provided by an internet service provider).

The units and/or modules in the terminal described in the embodiments of the present disclosure may be implemented in a software manner or a hardware manner.

In terms of hardware, the units and/or modules implementing the terminal of the embodiments of the present disclosure may be implemented by one or more of an application specific integrated circuit (ASIC), DSP, a programmable logic device (PLD), a complex programmable logic devices (CPLD), a field programmable gate array (FPGA) or other electronic component, for implementing the method according to the embodiments of the present disclosure.

In terms of software, the units and/or modules in the terminal that implement the method for displaying video content in the embodiments of the present disclosure may be implemented by two or more units.

The units and/or modules in the device for implementing the method for displaying video content according to the embodiment of the present disclosure are illustrated below with software as an example.

Figure 2:
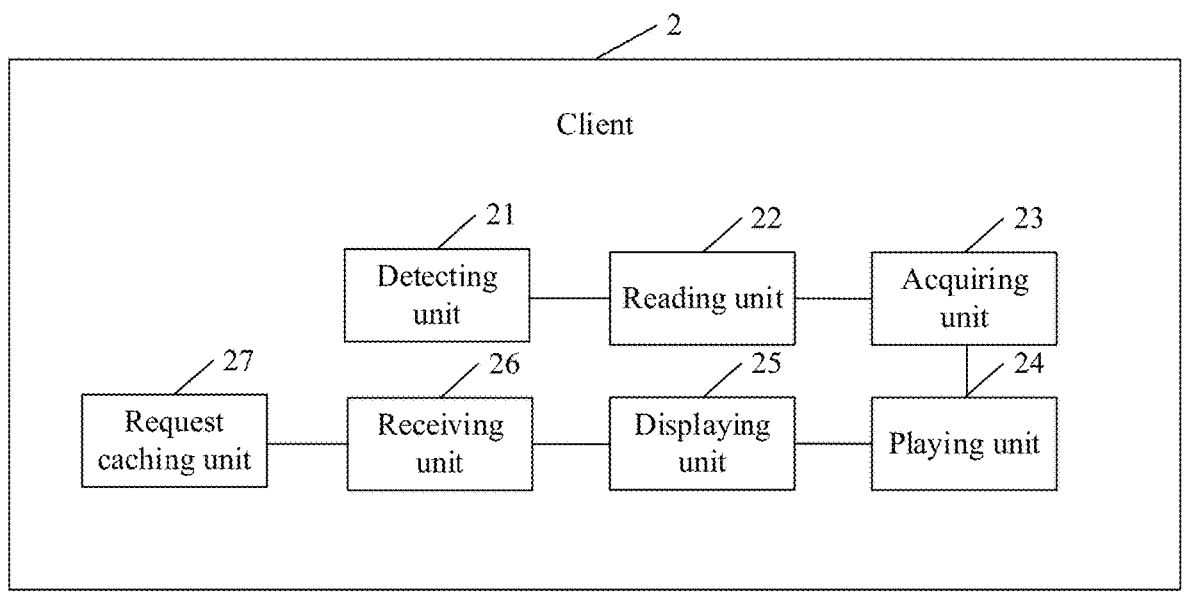
FIG. 2 is a schematic diagram showing a structure of a client according to an embodiment of the present disclosure.

FIG. 2 is a schematic diagram showing a structure of a client according to an embodiment of the present disclosure. As shown in FIG. 2, a client 2 includes a detecting unit 21, a reading unit 22, an acquiring unit 23, a playing unit 24, a displaying unit 25, a receiving unit 26 and a request catching unit 27.

The detecting unit 21 is configured to detect a current state parameter after a starting instruction is received.

The reading unit 22 is configured to read preloaded video data if the current state parameter meets a preset display condition. The preset display condition is used to determine whether to display video content to be displayed corresponding to the preloaded video data.

The acquiring unit 23 is configured to embed the preloaded video data into a current information stream to obtain an information stream to be displayed.

The playing unit 24 is configured to play a target video corresponding to the information stream to be displayed in response to the starting instruction, so as to display the video content.

Further, in the embodiments of the present disclosure, the target video includes: a video to be displayed corresponding to the preloaded video data, and a natural information stream video corresponding to the current information stream.

Further, in the embodiments of the present disclosure, the acquiring unit 23 is further configured to acquire a pre-stored simulation starting image and/or a pre-stored simulation starting video when the starting instruction is received.

The displaying unit 25 is configured to display the pre-stored simulation starting image and/or the pre-stored simulation starting video in response to the starting instruction.

Further, in the embodiments of the present disclosure, the playing unit 24 is configured to remove the pre-stored simulation starting image and/or the pre-stored simulation starting video; play the video to be displayed, and receive a control instruction corresponding to the video to be displayed; and play the natural information stream video based on the control instruction.

Further, in the embodiments of the present disclosure, the control instruction includes: viewing, switching or continuous playing.

The playing unit 24 is further configured to: in a case that the control instruction is viewing, in response to the control instruction, perform viewing processing according to a pre-stored content address corresponding to the video content to be displayed; receive a closing instruction corresponding to the pre-stored content address; and play the natural information stream video in response to the closing instruction.

The playing unit 24 is further configured to close the video to be displayed and switch to the natural information stream video in response to the control instruction.

The playing unit 24 is further configured to: in a case that the control instruction is continuous playing, display the natural information stream video in response to the control instruction after the video to be displayed is displayed.

Further, in the embodiments of the present disclosure, the receiving unit 26 is configured to, based on the control instruction, receive a return instruction corresponding to the natural information stream video after the natural information stream video is played.

The playing unit 24 is further configured to close the natural information stream video and switch to the video to be displayed in response to the return instruction.

The playing unit 24 is further configured to display the video to be displayed according to a preset time parameter, a preset component configuration and a preset animation effect.

Further, in the embodiments of the present disclosure, the acquiring unit 23 is further configured to, before the preloaded video data is read, acquire a preload task corresponding to the video content to be displayed. The preload task carries a preloading strategy, and the preloading strategy is used to limit a preset network parameter and a preset data parameter on the video content to be displayed.

The request caching unit 27 is configured to request and cache the preloaded video data according to the preset network parameter and the preset data parameter.

It should be pointed out that the classification of the above units does not constitute a limitation on the client itself. For example, some units each may be split into two or more subunits. Alternatively, some units may be merged into a new unit.

It should also be pointed out that respective names of the above units do not constitute limitations on the units themselves under certain circumstances.

For the same reason, units and/or modules not described in detail in the client do not represent that the corresponding units and/or modules are not included in the client. All operations performed by the client may be implemented by corresponding units and/or modules in the client.

Figure 3:
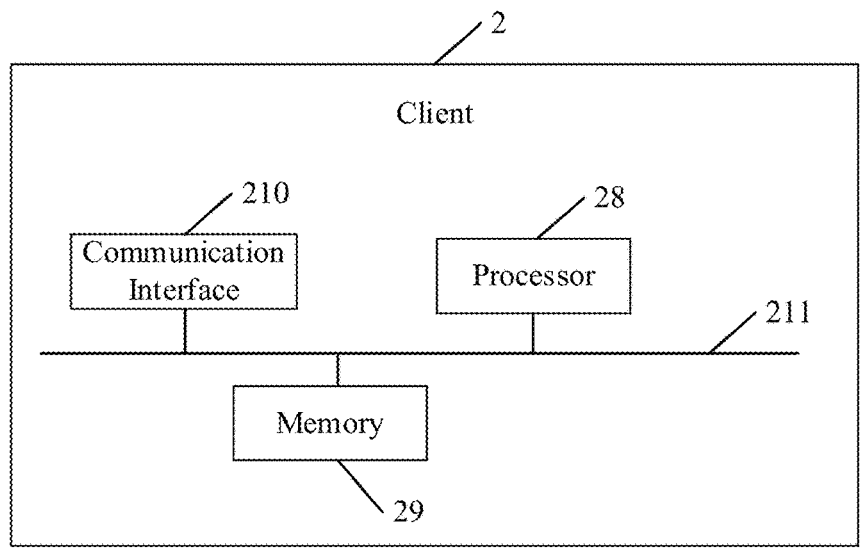
FIG. 3 is a schematic diagram showing a structure of a client according to another embodiment of the present disclosure.

FIG. 3 is a schematic diagram showing a structure of the client according to another embodiment of the present disclosure. As shown in FIG. 3, the client 2 according to the embodiment of the present disclosure further includes a processor 28, and a memory 29 storing instructions executable by the first processor 28. The client 2 further includes a communication interface 210, and a bus 211 for connecting the processor 28, the memory 29 and the communication interface 210.

In the embodiments of the present disclosure, the bus 211 is configured to connect the communication interface 210, the processor 28 and the memory 29 to each other, and communication among these devices are performed through the bus 211.

In the embodiments of the present disclosure, the memory 29 is configured to store instructions and data.

Further, in the embodiments of the present disclosure, the processor 28 is configured to: detect a current state parameter when a starting instruction is received; read preloaded video data if the current state parameter meets a preset display condition, where the preset display condition is used to determine whether to display the video content to be displayed corresponding to the preloaded video data; embed the preloaded video data into a current information stream to obtain information stream to be displayed; and play, in response to the starting instruction, a target video corresponding to the information stream to be displayed, to display the video content.

A client is provided according to embodiments of the present disclosure. The client detects the current state parameter when receiving a starting instruction; reads the preloaded video data if the current state parameter meets a preset display condition, where the preset display condition is used to determine whether to display the video content to be displayed corresponding to the preloaded video data; embeds the preloaded video data into the current information stream to obtain the information stream to be displayed; and plays, in response to the starting instruction, the target video corresponding to the information stream to be displayed, to display the video content. That is, in the embodiments of the present disclosure, after determining that the current state parameter meets the preset display condition, the client embeds the preloaded video data corresponding to the video content to be displayed into the current information stream to obtain the information stream to be displayed, thereby displaying the video content to be displayed by playing the target video corresponding to the information stream to be displayed. It can be seen that the information stream to be displayed is obtained by the client by embedding the preloaded video data into the current information stream, that is, the video content to be displayed is a part of the information stream. Therefore, when the client displays the video content to be displayed by playing the target video, seamless splicing of a splash stage and an information stream stage is achieved, and smooth transition between the video to be displayed and the natural information stream video is achieved, thereby improving the promotion effect of the video content to be displayed and the fluency of the video content to be displayed.

Figure 4:
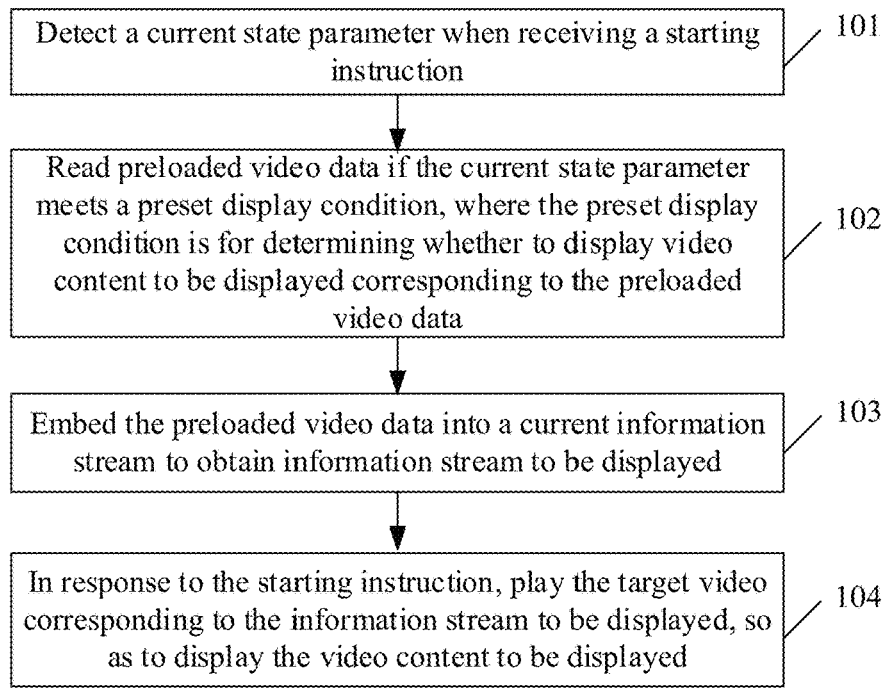
FIG. 4 is a schematic flowchart showing a method for displaying video content according to an embodiment of the present disclosure.

In an embodiment of the present disclosure, reference is made to FIG. 4, which is a schematic flowchart showing a method for displaying video content according to an embodiment of the present disclosure. As shown in FIG. 4, the method for the client to display the video content to be displayed includes the following steps 101 to 104.

In step 101, a current state parameter is detected after a starting instruction is received.

In the embodiment of the present disclosure, after receiving the starting instruction, the client first detects the current state parameter. The client receives the starting instruction in various ways. For example, the client receives the starting instruction through a user touch operation received by the terminal. Alternatively, the client receives the starting instruction through the triggering of the starting mechanism preset by the terminal.

It should be noted that, in the embodiments of the present disclosure, the client in the terminal refers to a program corresponding to the server and providing local services for the client. Except for some applications that only run locally, the client is generally installed on a common terminal and cooperates with the server to run.

After the development of the Internet, commonly used clients include web browsers used in the World Wide Web, email clients for sending and receiving emails, and client software for instant messaging. For this type of application, there are corresponding servers and service programs in the network to provide corresponding services, such as database services and e-mail services. In this way, a specific communication connection is established between the terminal and the server to ensure the normal operation of the application.

It should be noted that, in the embodiments of the present disclosure, the server may serve the client, such as providing resources to the client, storing client data.

Further, in the embodiments of the present disclosure, after receiving the starting instruction, the client detects the state of the client to obtain the current state parameter, thereby further determining according to the current state parameter whether to display the video content to be displayed.

That is, in the embodiments of the present disclosure, the current state parameter may be used to determine whether the client has the conditions for displaying the video content to be displayed.

It should be noted that, in the embodiments of the present disclosure, the video content to be displayed may be a native splash advertisement, that is, the video to be displayed may be a video of a native splash advertisement.

Alternatively, in the embodiments of the present disclosure, the video content to be displayed may also be other content of the native splash advertisement. For example, the video content to be displayed may be weather notification content, breaking news content, tracing content, disaster warning content, and the like. Correspondingly, the video to be displayed may be a weather notification video, a breaking news video, a tracing video, a disaster warning video, and the like.

It should be noted that, in the embodiments of the present disclosure, the current state parameter may include, but is not limited to, at least one of various state parameters such as a data loading state, a data invalidation state, a display timing state, and an information stream insertion state.

Further, in the embodiments of the present disclosure, the data loading state in the current state parameter represents whether the client has finished loading the video data corresponding to the video content to be displayed. The data invalidation state in the current state parameter is used to determine whether the data cached by the client is expired or invalid. The display timing state in the current state parameter is used to determine whether the client is at the display timing (not in a feed page/pushing open/return page open/third-party application activation/in the feed page but with other interactions). The information stream insertion state in the current state parameter is used by the client to determine whether the video content to be displayed is inserted into the information stream.

In step 102, if the current state parameter meets the preset display condition, the preloaded video data is read. The preset display condition is used to determine whether to display the video content to be displayed corresponding to the preloaded video data.

In the embodiments of the present disclosure, after detecting the current state parameter, the client reads the preloaded video data if the current state parameter meets the preset display condition.

It should be noted that, in the embodiments of the present disclosure, the client may preset a determination condition for whether to display the video content to be displayed, that is, the preset display condition. That is, in the embodiments of the present disclosure, the preset display condition is used for the client to determine based on the current state parameter whether to display the video content to be displayed corresponding to the preloaded video data.

Further, in the embodiments of the present disclosure, the preloaded video data is part of all the video data corresponding to the video content to be displayed, rather than all the video data corresponding to the video content to be displayed. That is, in the present disclosure, the preloaded video data may be used to perform partial display of the video data for the video content to be presented.

It should be noted that, in the embodiments of the present disclosure, after detecting and acquiring the current state parameter, the client first determines according to the current state parameter and the preset display condition whether to display the video content to be displayed. If it is determined to display the video content to be displayed, the client reads the preloaded video data of the video content to be displayed. For example, if the current state parameter obtained by the client detection meet the preset display conditions such as the preloaded video data is loaded successfully, the data is validated, the client is at the display timing, and the current information stream allows the insertion of the splash advertisement, the client reads the preloaded video.

Further, in the embodiments of the present disclosure, before reading the preloaded video data, the client first acquires a preloading task corresponding to the video content to be displayed. The preloading task carries a preloading strategy. The preloading strategy is used to limit a preset network parameter and a preset data parameter of the video content to be displayed. Then, the preloaded video data is requested and cached according to the preset network parameter and the preset data parameter.

In the embodiments of the present disclosure, a queue is maintained for preloading the video data of the video content to be displayed. The preloading of each video corresponds to a separate task, that is, the preloading task. The preloading task is controlled by the preset network parameter issued by the server to control the network environment allowed by the preloading. For example, the server only allows preloading of video data in a wireless network environment. In the preloading task, the size of the preloaded content may be controlled by a preset data parameter delivered by the server. For example, the total size of the video content to be displayed is 3M, and the preload size field delivered by the server is 800k. The client only requests the first 800k video data of all the video to be displayed to the local so as to ensure the smooth playing of the first few seconds when the user opens the screen, and then requests the subsequent content in real time, thereby saving traffic.

In step 103, the preloaded video data is embedded into the current information stream to obtain the information stream to be displayed.

In the embodiments of the present disclosure, after reading the preloaded video data, the client embeds the preloaded video data into the current information stream, so as to obtain the information stream to be displayed.

It should be noted that, in the embodiments of the present disclosure, after determining to display the video content to be displayed and reading the corresponding preloaded video data, the client inserts the preloaded video data into the original current information stream to be displayed, to obtain the information stream to be displayed. The information stream to be displayed can seamlessly and smoothly splicing and display the video content to be displayed and the current information stream.

Further, in the embodiments of the present disclosure, the display of video content is divided into a splash stage and an information stream stage. The seamless transition from the splash stage to the information stream stage lies in visual switching, which is achieved by adjusting the display level of the video from the display.

In step 104, the target video corresponding to the information stream to be displayed is played in response to the starting instruction, to display the video content to be displayed.

In the embodiments of the present disclosure, after embedding the preloaded video data into the current information stream to obtain the information stream to be displayed, the client and plays the target video corresponding to the information stream to be displayed in response to the starting instruction, thereby displaying the video content to be displayed.

Further, in the embodiments of the present disclosure, the information stream to be displayed is obtained by the client embedding preloaded video data into the current information stream. Therefore, the target video corresponding to the information stream to be displayed may include the video to be displayed corresponding to the preloaded video data, and the natural information stream video corresponding to the current information stream.

It should be noted that, in the embodiments of the present disclosure, the display of the video content is divided into a splash stage and an information stream stage, that is, the video content to be displayed includes a video to be displayed and a natural information stream video.

Figure 5:
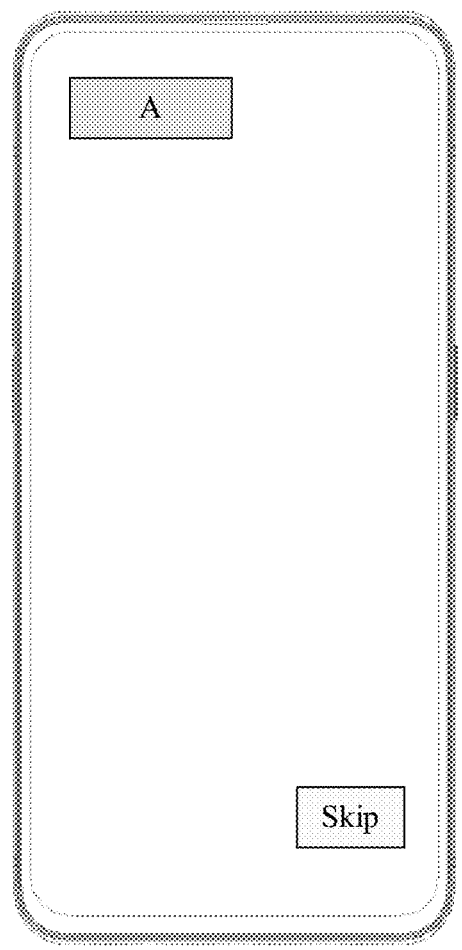
FIG. 5 is a schematic diagram showing a splash stage.

Further, in the embodiment of the present disclosure, in the splash stage, the video to be displayed may be displayed as a pure video. FIG. 5 is a schematic diagram showing a splash stage. As shown in FIG. 5, in the splash stage of displaying the video to be displayed, the client displays a pure video interface. In the video interface, the client logo "A" is displayed in the upper left corner, and there is a skip button in the lower right corner.

Further, in the embodiments of the present disclosure, the information stream stage, that is, the natural information stream video is the same as the common information stream advertisement in the interaction of each advertisement component. In the information stream stage, the client updates the number of comments and likes of the natural information stream video in real time, this is because the preloaded video data is loaded before. Further, in the information stream stage, the client forcibly turns on restrictions such as the current privacy status and comment switch, thereby preventing abnormal cases at the beginning of the delivery.

It should be noted that, in the embodiments of the present disclosure, the information stream to be displayed is obtained by the client by embedding preloaded video data into the current information stream, that is, the video content to be displayed is already in the feed stream. Therefore, when displaying the video content to be displayed based on the target video corresponding to the information stream to be displayed, the client switches between the video to be displayed and the natural information stream video through a swipe-up operation or swipe-down operation received by the terminal.

That is, when playing the video content to be displayed in the target video corresponding to the information stream to be displayed, the client switches the video content to be displayed to the natural information stream video when receiving the user swipe-up operation through the terminal. When playing the natural information stream video in the target video corresponding to the information stream to be displayed, the client switches the natural information stream video to the video content to be displayed when receiving the user swipe-down operation through the terminal. Therefore, smooth transition between the video to be displayed and the natural information stream video is achieved, and the splash stage and the information stream stage are seamlessly spliced.

Further, in the embodiments of the present disclosure, the client implements a seamless transition from the splash stage to the information stream stage by adjusting the display level of the video. In order to display the video in full screen during the splash stage, the client sets the entire frame of the player view to the size of the entire screen and displays the video completely (setting clipToBounds of a parent view as NO, which is equivalent to the front of the display hierarchy, and is not constrained by the size of the parent view). Further, the client hides a top selection component, various interactive components on the video, and a bottom tabbar. Further, after displaying the video to be displayed, the client sets clipToBounds of the parent view as YES. In this case, the player view is constrained by the parent view, the display level is behind, and the actual display area becomes smaller, which is consistent with the natural feed stream video when responding to user swiping.

In the embodiments of the present disclosure, the client displays the video to be displayed according to the preset time parameter, the preset component configuration and the preset animation effect. For example, the client displays the video to be displayed according to the preset time parameter, the preset component configuration and the preset animation effect, so as to obtain the following effects: When the countdown of seconds for the configuration delivered by the server ends, the client animates and displays these controls in sequence: 1, elements such as a splash logo and preloading skip, and fades out and disappears within 0.26 s; 2, tab, a bottom shadow, a top, a basic component, and a home page component are displayed when 0.26 s elapses, and the animation fades out in 0.43 s; and 3, the default application state is restored after the total duration of 0.69 s is completed.

With the method for displaying video content according to embodiments of the present disclosure, the client detects the current state parameter when receiving a starting instruction; reads the preloaded video data if the current state parameter meets the preset display condition, where the preset display condition is used to determine whether to display the video content to be displayed corresponding to the preloaded video data; embeds the preloaded video data into the current information stream to obtain the information stream to be displayed; and plays, in response to the starting instruction, the target video corresponding to the information stream to be displayed, to display the video content. That is, in the embodiments of the present disclosure, after determining that the current state parameter meets the preset display condition, the client embeds the preloaded video data corresponding to the video content to be displayed into the current information stream to obtain the information stream to be displayed, thereby displaying the video content to be displayed by playing the target video corresponding to the information stream to be displayed. It can be seen that the information stream to be displayed is obtained by the client by embedding the preloaded video data into the current information stream, that is, the video content to be displayed is a part of the information stream. Therefore, when the client displays the video content to be displayed by playing the target video, seamless splicing of a splash stage and an information stream stage is achieved, and smooth transition between the video to be displayed and the natural information stream video is achieved, thereby improving the promotion effect of the video content to be displayed and the fluency of the video content to be displayed.

Figure 6:
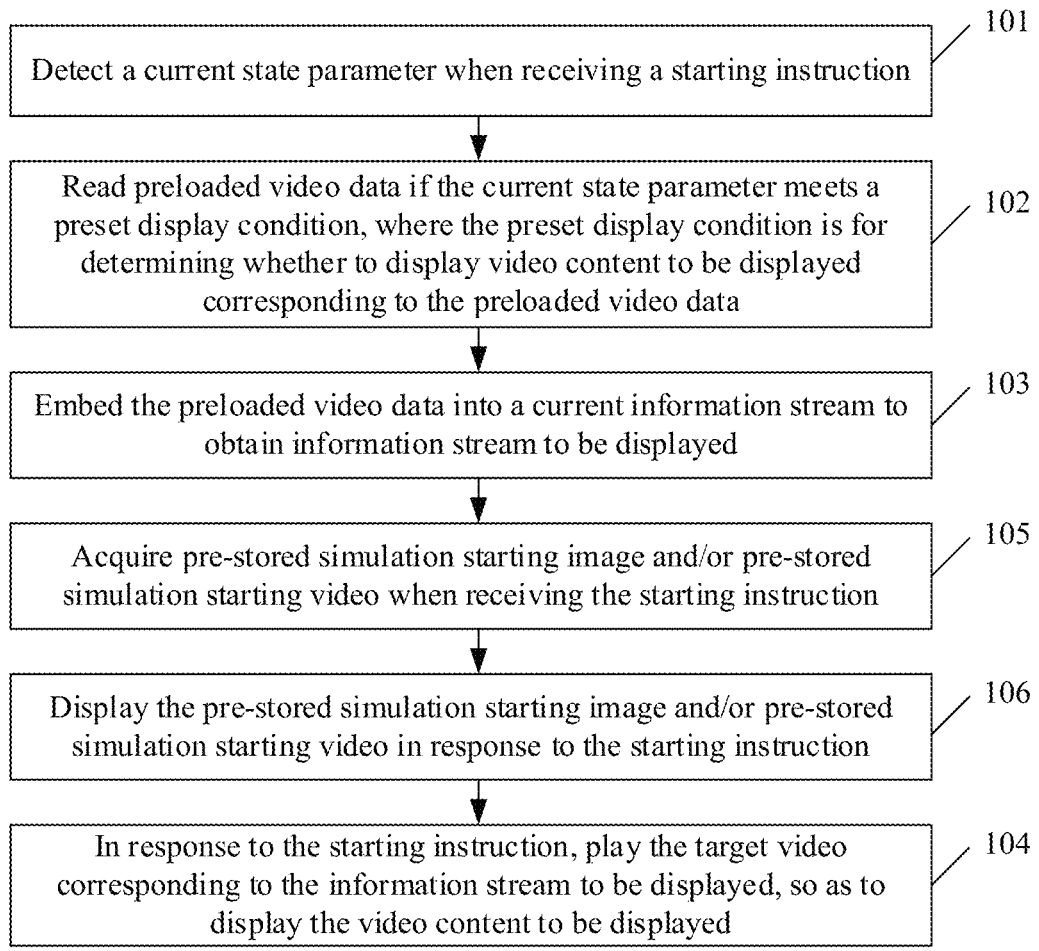
FIG. 6 is a schematic flowchart showing a method for displaying video content according to another embodiment of the present disclosure.

Based on the above embodiment, in another embodiment of the present disclosure, FIG. 6 is a schematic flowchart showing a method for displaying video content according to another embodiment of the present disclosure. As shown in FIG. 6, before the client plays the target video corresponding to the information stream to be displayed, that is, before step 104, the method for displaying the video content to be displayed by the client further includes the following steps 105 to 106.

In step 105, after the starting instruction is received, a pre-stored simulation starting image and/or a pre-stored simulation starting video is acquired.

In step 106, in response to the starting instruction, the pre-stored simulation starting image and/or the pre-stored simulation starting video is displayed.

In the embodiments of the present disclosure, after receiving the starting instruction and before playing the target video corresponding to the information stream to be displayed, the client first acquires the pre-stored simulation starting image and/or the pre-stored simulation starting video, and then displays the pre-stored simulation starting image and/or the pre-stored simulation starting video in response to the starting instruction.

It should be noted that, in the embodiments of the present disclosure, the client pre-stores a pre-stored simulation starting image and/or a pre-stored simulation starting video. The pre-stored simulated starting image and/or the pre-stored simulated starting video is used to avoid play freezes.

Further, in the embodiments of the present disclosure, in order to avoid the display of the empty feed caused by the play freezes, after receiving the starting instruction and being started, the client forms an illusion of starting by displaying the pre-stored simulation starting image and/or the pre-stored simulation starting video.

It should be noted that, in the embodiments of the present disclosure, after displaying the pre-stored simulation starting image and/or the pre-stored simulation starting video in response to the starting instruction, when the display of the target video is ready, the client removes the pre-stored simulation starting image and/or the pre-stored simulation starting video when playing the target video corresponding to the information stream to be displayed, thereby entering a display interface of the video content.

Figure 7:
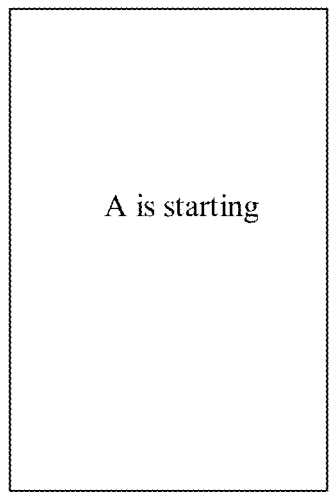
FIG. 7 is a schematic diagram showing a pre-stored simulation starting image.

FIG. 7 is a schematic diagram showing a pre-stored simulation starting image. As shown in FIG. 7, after receiving a starting instruction, a client A first displays a pre-stored simulation starting image when starting. The client A shows the user the state that the client A is still being started by displaying the simulation starting image.

Figure 8:
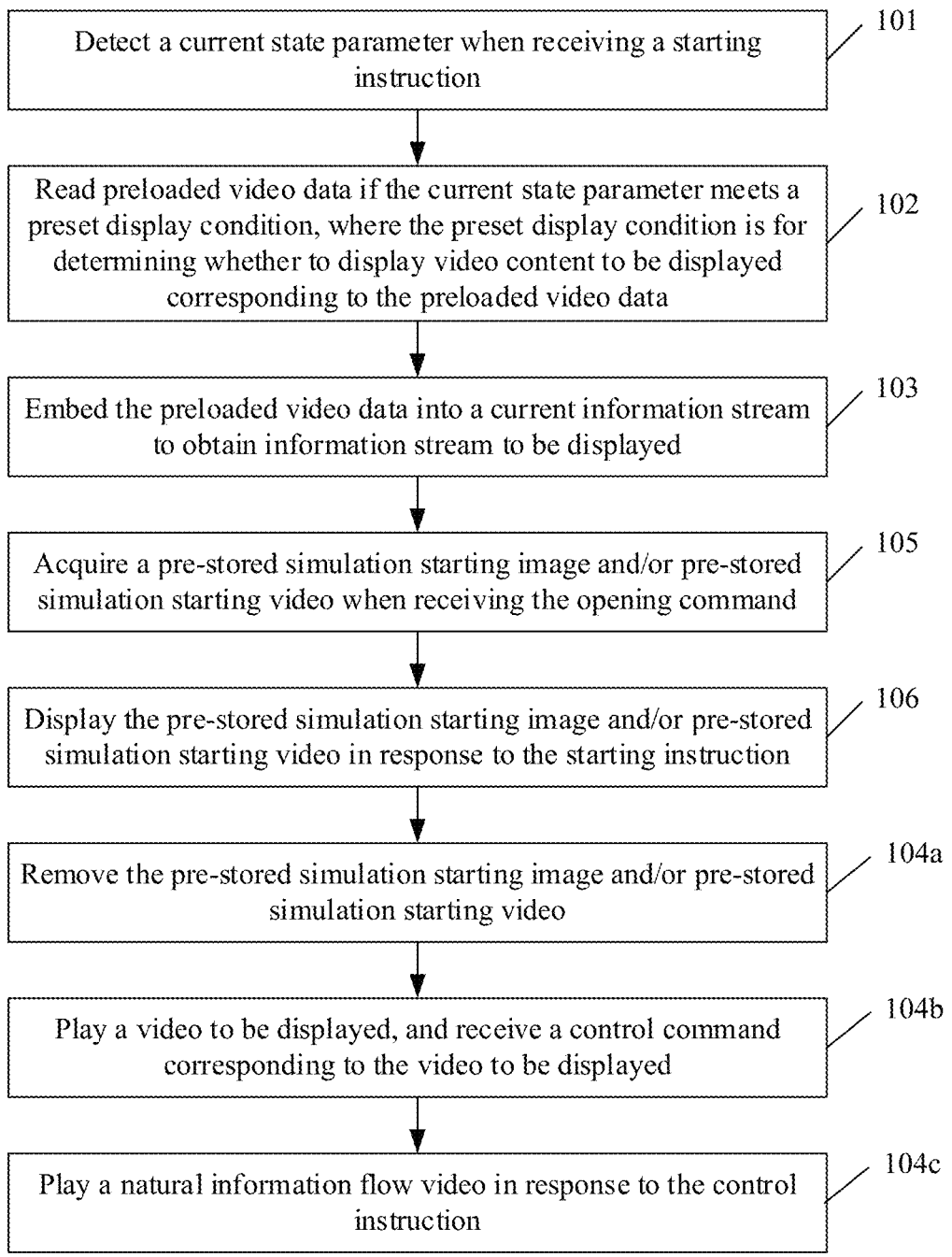
FIG. 8 is a schematic flowchart showing a method for displaying video content according to another embodiment of the present disclosure.

Further, in the embodiments of the present disclosure, FIG. 8 is a schematic flowchart showing a method for displaying video content according to another embodiment of the present disclosure. As shown in FIG. 8, the method for the client to play the target video corresponding to the information stream to be displayed includes the following steps 104a to 104c.

In step 104a, the pre-stored simulated starting image and/or the pre-stored simulated starting video is removed.

In the embodiments of the present disclosure, after embedding the preloaded video data into the current information stream and acquiring the information stream to be displayed, the client first removes the pre-stored simulation starting image and/or the pre-stored simulation starting video.

It should be noted that, in the embodiments of the present disclosure, in order to avoid the display of an empty feed caused by play freezes, the client first displays a pre-stored simulated starting image and/or a pre-stored simulated starting video. Once the target video corresponding to the information stream to be displayed is ready to be displayed, the client first removes the pre-stored simulation starting image and/or the pre-stored simulation starting video, so as to further enter the display interface of the video content.

In step 104*b*, the video to be displayed is played, and a control instruction corresponding to the video to be displayed is received.

In the embodiments of the present disclosure, after removing the pre-stored simulation starting image and/or the pre-stored simulation starting video, the client plays the video to be displayed, and then receives the control instruction corresponding to the video to be displayed.

It should be noted that, in the embodiments of the present disclosure, when displaying the video content to be displayed, the client first plays the video to be displayed corresponding to the preloaded video data. During the playing of the video to be displayed, the client may receive the control instruction corresponding to the video to be displayed through the terminal.

Further, in the embodiments of the present disclosure, the control instruction received by the client may include, but is not limited to, instructions such as viewing, switching, or continuous playing.

In step 104*c*, the natural information stream video is played based on the control instruction.

In the embodiments of the present disclosure, after playing the video to be displayed and receiving the control instruction corresponding to the video to be displayed, the client plays the natural information stream video based on the control instruction.

Further, in the embodiments of the present disclosure, the control instruction received by the client in the process of playing the video to be displayed may be further used to control the playing of the natural information stream video.

It should be noted that, in the embodiments of the present disclosure, when the client plays the natural information stream video based on the control instruction, if the control instruction is switching, the client directly switches the video to be displayed to the natural information stream video for playing.

That is, when displaying the video content to be displayed, that is, when playing the target video including the video to be displayed and the natural information stream video, the client may receive a control instruction, so that the corresponding play control process is performed based on the control instruction.

With the method for displaying video content according to embodiments of the present disclosure, the client detects the current state parameter when receiving a starting instruction; reads the preloaded video data if the current state parameter meets a preset display condition, where the preset display condition is used to determine whether to display the video content to be displayed corresponding to the preloaded video data; embeds the preloaded video data into the current information stream to obtain the information stream to be displayed; and plays, in response to the starting instruction, the target video corresponding to the information stream to be displayed, to display the video content. That is, in the embodiments of the present disclosure, after determining that the current state parameter meets the preset display condition, the client embeds the preloaded video data corresponding to the video content to be displayed into the current information stream to obtain the information stream to be displayed, thereby displaying the video content to be displayed by playing the target video corresponding to the information stream to be displayed. It can be seen that the information stream to be displayed is obtained by the client embedding the preloaded video data into the current information stream, that is, the video content to be displayed is a part of the information stream. Therefore, when the client displays the video content to be displayed by playing the target video, seamless splicing of a splash stage and an information stream stage is achieved, and smooth transition between the video to be displayed and the natural information stream video is achieved, thereby improving the promotion effect of the video content to be displayed and the fluency of the video content to be displayed.

Based on the above embodiments, in another embodiment of the present disclosure, when the control instruction is viewing, the method for the client to play the natural information stream video based on the control instruction includes the following steps 201 to 203.

In step 201, in response to the control instruction, viewing processing is performed according to a pre-stored content address of the video content to be displayed.

In the embodiments of the present disclosure, after playing the video to be displayed and receiving the control instruction corresponding to the video to be displayed, if the control instruction is viewing, in response to the control instruction, the client performs viewing processing according to the corresponding pre-stored content address of the video content to be displayed.

It should be noted that, in the embodiments of the present disclosure, after receiving the control instruction of viewing when playing the video to be displayed, the client acquires the pre-stored content address corresponding to the video content to be displayed in response to the control instruction, and then performs viewing processing based on the pre-stored content address.

Further, in the embodiments of the present disclosure, the client receives the control instruction of viewing through the user click operation received by the terminal on the display screen.

That is, in the present disclosure, when the video to be displayed is played, the user clicks any position in the video content area, and the client can respond and jump to the schema link configured by the server.

In step 202, a closing instruction corresponding to the pre-stored content address is received.

In step 203, the natural information stream video is played in response to the closing instruction.

In the embodiments of the present disclosure, after performing the viewing processing according to the pre-stored content address corresponding to the video content to be displayed in response to the control instruction, the client receives the closing instruction corresponding to the pre-stored content address, and then plays the natural information stream video in response to the closing instruction.

That is, in the present disclosure, after viewing the pre-stored content address corresponding to the video content to be displayed, the user performs a touch operation on the display screen of the terminal, so that the client terminal receives the closing instruction. After receiving the closing instruction, the client directly switches to the natural information stream video.

Further, in the embodiments of the present disclosure, after receiving the closing instruction, the client returns to the video to be displayed, and plays the video to be displayed.

In the embodiments of the present disclosure, in a case that the control instruction is switching, when the natural information stream video is played based on the control instruction, the client closes the video to be displayed in response to the control instruction, then switches to the natural information stream video, and plays the natural information stream video.

Figure 9:
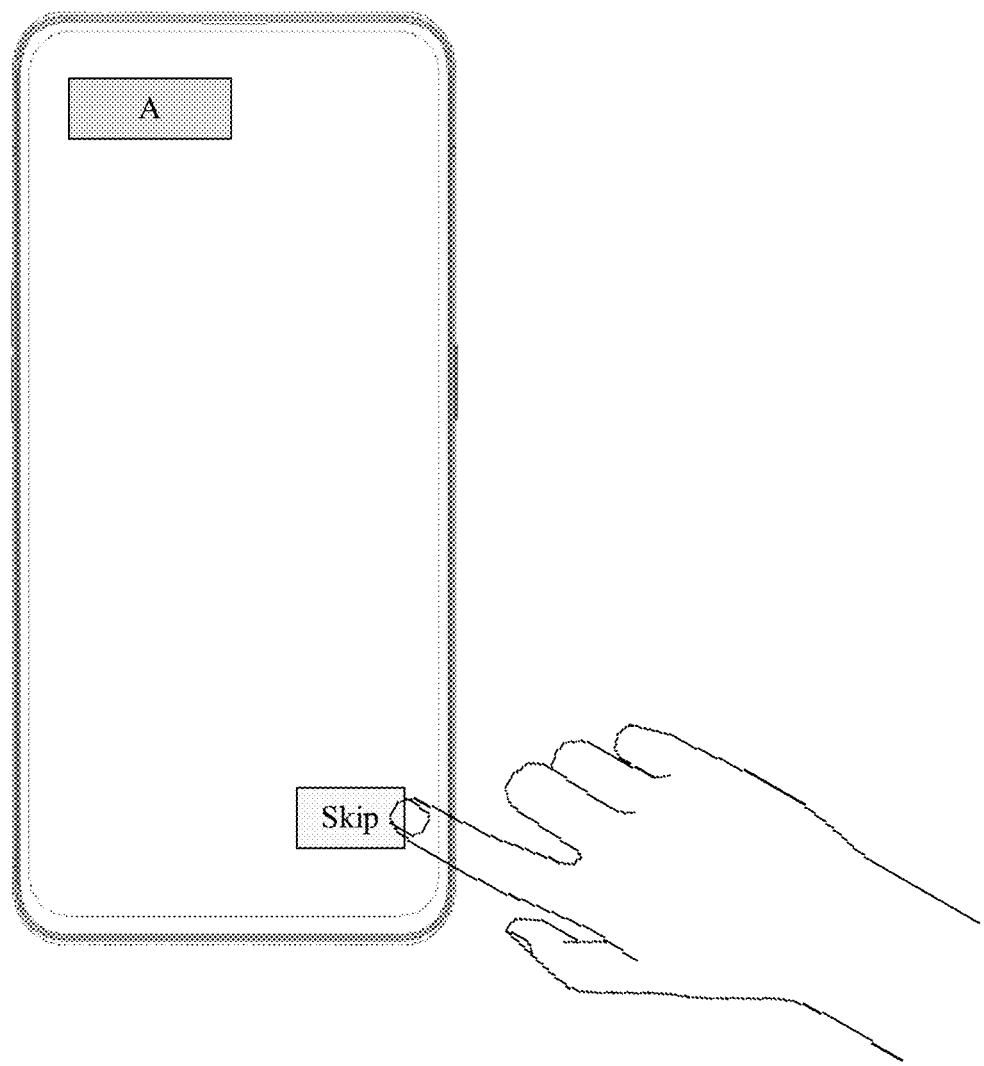
FIG. 9 is a schematic diagram showing receiving of a control instruction.
Figure 10:
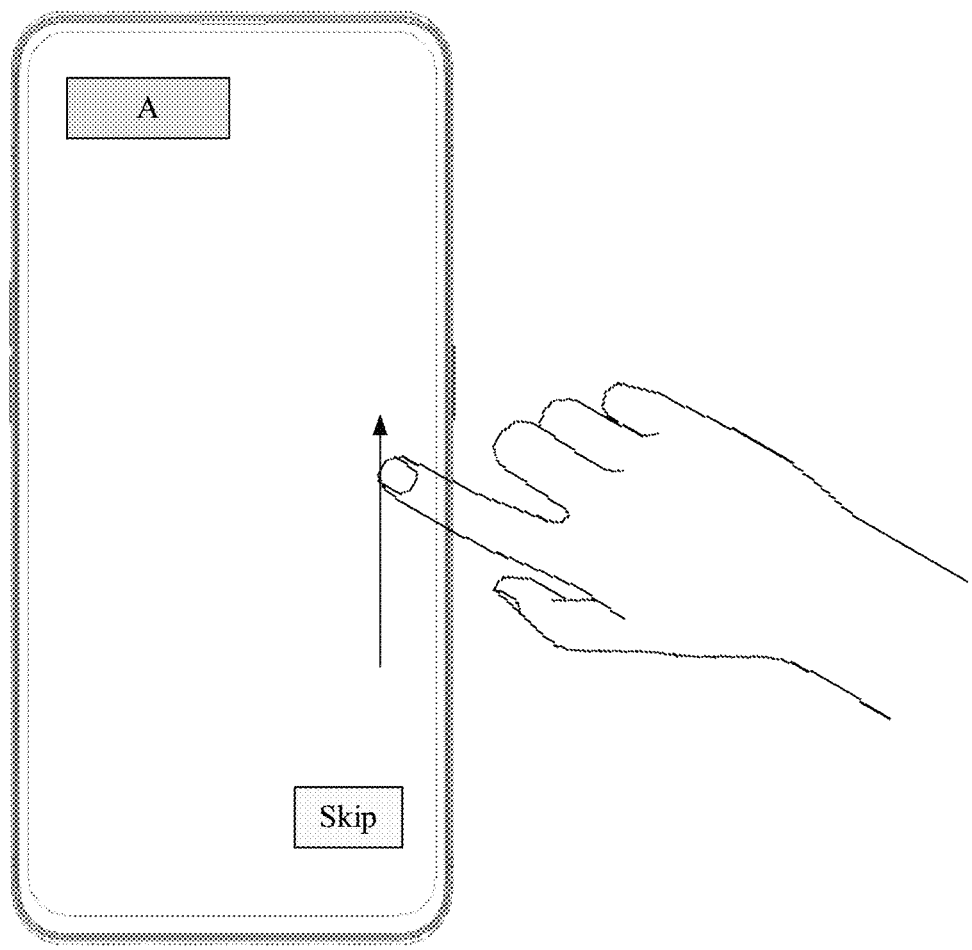
FIG. 10 is a schematic diagram showing receiving of a control instruction.

It should be noted that, in the embodiments of the present disclosure, the client acquires the control instruction of switching through the touch operation received by the terminal on the display screen. For example, FIG. 9 is a schematic diagram showing receiving of a control instruction. As shown in FIG. 9, the client receives the control instruction of switching when the user clicks the skip button in the video to be displayed played by the client. Alternatively, the client acquires the control instruction of switching through a sliding operation received by the terminal on the display screen. FIG. 10 is a schematic diagram showing receiving of a control instruction. As shown in FIG. 10, the client receives the control instruction of switching when the user performs a swipe-up operation in the video to be displayed played by the client.

That is, when playing the video to be displayed in the target video corresponding to the information stream to be displayed, if the client receives the user swipe-up operation through the terminal, the client terminal switches the video to be displayed to the natural information stream video. In this way, a smooth transition between the video to be displayed and the natural information stream video is achieved, that is, the seamless splicing of the splash stage and the information stream stage is achieved.

In the embodiments of the present disclosure, when the control instruction is continuous playing, when the natural information stream video is played based on the control instruction, the client, in response to the control instruction, displays the natural information stream video after displaying the video to be displayed.

It should be noted that, in the embodiments of the present disclosure, if the client acquires no control instruction in the interface of the video to be displayed during the process of playing the video to be displayed, the control instruction is determined as continue playing. In this case, after displaying the video to be displayed, the client naturally transitions to the information stream stage, that is, plays the natural information stream video.

Further, in the embodiments of the present disclosure, in a case that the control instruction is continuous playing, after the natural information stream video is played based on the control instruction, the client receives the return instruction corresponding to the natural information stream video, and then closes the natural information stream video in response to the return instruction, and switches to the video to be displayed.

That is, when playing the natural information stream video in the target video corresponding to the information stream to be displayed, if the user swipe-down operation is received through the terminal, the client switches the natural information stream video to the video to be displayed. In this way, a smooth transition between the video to be displayed and the natural information stream video is achieved, that is, the seamless splicing of the screen starting stage and the information stream stage is achieved.

With the method for displaying video content according to embodiments of the present disclosure, the client detects the current state parameter when receiving a starting instruction; reads the preloaded video data if the current state parameter meets the preset display condition, where the preset display condition is used to determine whether to display the video content to be displayed corresponding to the preloaded video data; embeds the preloaded video data into the current information stream to obtain the information stream to be displayed; and plays, in response to the starting instruction, the target video corresponding to the information stream to be displayed, to display the video content. That is, in the embodiments of the present disclosure, after determining that the current state parameter meets the preset display condition, the client embeds the preloaded video data corresponding to the video content to be displayed into the current information stream to obtain the information stream to be displayed, thereby displaying the video content to be displayed by playing the target video corresponding to the information stream to be displayed. It can be seen that the information stream to be displayed is obtained by the client by embedding the preloaded video data into the current information stream, that is, the video content to be displayed is a part of the information stream. Therefore, when the client displays the video content to be displayed by playing the target video, seamless splicing of a splash stage and an information stream stage is achieved, and a smooth transition between the video to be displayed and the natural information stream video is achieved, thereby improving the promotion effect of the video content to be displayed and the fluency of the video content to be displayed.

A computer-readable storage medium is provided according to an embodiment of the present disclosure. A program is stored on the computer-readable storage medium. When the program is executed by the processor, the method for displaying video content as described above is implemented.

Program instructions corresponding to the method for displaying video content in the embodiments of the present disclosure may be stored on a storage medium such as an optical disk, a hard disk, and a U disk. A client, when reading or executing a program instruction corresponding to the method for displaying video content in the storage medium, detects the current state parameter when receiving a starting instruction; reads the preloaded video data if the current state parameter meets the preset display condition, where the preset display condition is used to determine whether to display the video content to be displayed corresponding to the preloaded video data; embeds the preloaded video data into the current information stream to obtain the information stream to be displayed; and plays, in response to the starting instruction, the target video corresponding to the information stream to be displayed, to display the video content.

Those skilled in the art should appreciate that the present disclosure may be implemented in hardware embodiments, software embodiments, or a combination of software and hardware. Furthermore, the present disclosure may be implemented as a computer program product embodied on one or more computer-readable storage media (including but not limited to disk storage, optical storage and the like) having computer-readable program code embodied therein.

The present disclosure is described with reference to schematic flowchart illustrations and/or block diagrams of implementations of methods, devices (systems), and computer program products according to embodiments of the present disclosure. It should be understood that each process and/or block in the schematic flowchart illustrations and/or block diagrams, and combinations of processes and/or blocks in the schematic flowchart illustrations and/or block diagrams, may be implemented by computer program instructions. These computer program instructions may be provided to a processor of a general purpose computer, special purpose computer, embedded processor or other programmable data processing device to produce a machine, such that instructions executed by a processor of a computer or other programmable data processing device produce a device for implementing functions specified in one or more processes in the flowchart diagrams and/or one block or more blocks in the block diagrams.

The computer program instructions may be stored in a computer readable memory capable of directing a computer or other programmable data processing apparatus to function in a particular manner, such that the instructions stored in the computer readable memory result in an article of manufacture including the instruction means. The instruction means implements the functions specified in one or more processes in the flowchart diagrams and/or one block or more blocks in the block diagrams.

Alternatively, these computer program instructions are loaded onto a computer or other programmable data processing device such that a series of operational steps are performed on the computer or other programmable device to produce a computer-implemented process, so that instructions executed on a computer or other programmable device provide steps for implementing the functions specified in one or more processes in the flowchart diagrams and/or one block or more blocks in the block diagrams.

Merely preferred embodiments of the present disclosure are described above, and are not intended to limit the protection scope of the present disclosure.

The invention claimed is:

1. A method for displaying video content, comprising:
detecting a current state parameter when receiving a starting instruction, wherein the current state parameter comprises a data loading state indicating whether a client terminal has finished loading video data corresponding to the video content, a data invalidation state indicating whether the video data cached by the client terminal has expired, a display timing state indicating whether the client terminal is at a display timing, and an insertion state indicating whether the video content is allowed to insert into a natural information stream;
determining whether the current state parameter meets a preset display condition for displaying the video content;
reading preloaded video data in response to determining that the current state parameter meets the preset display condition, wherein the preset display condition is used to determine whether to display the video content corresponding to the preloaded video data;
embedding the video content into the natural information stream to obtain information stream corresponding to a target video, wherein the target video comprises the natural information stream and the video content embedded in the natural information stream;
in response to the starting instruction, playing the target video; and
performing smooth transitions between the video content and the natural information stream while playing the target video, wherein the smooth transitions comprise switching from the video content to the natural information stream and switching from the natural information stream to the video content, and wherein the performing smooth transitions between the video content and the natural information stream while playing the target video further comprises switching between the video content and the natural information stream in response to receiving a swipe operation performed by a user.

2. The method according to claim 1, wherein before the playing the target video, the method further comprises:
acquiring at least one of a pre-stored simulation starting image or a pre-stored simulation starting video when receiving the starting instruction; and
displaying at least one of the pre-stored simulation starting image or the pre-stored simulation starting video in response to the starting instruction.

3. The method according to claim 2, wherein the playing the target video further comprises:
removing at least one of the pre-stored simulation starting image or the pre-stored simulation starting video;
playing the video content, and receiving a control instruction; and
playing the natural information stream based on the control instruction.

4. The method according to claim 3, wherein the control instruction comprises: viewing, switching or continuous playing.

5. The method according to claim 4, wherein in response to determining that the control instruction is viewing, the playing the natural information stream based on the control instruction comprises:
in response to the control instruction, performing viewing processing according to a prestored content address corresponding to the video content;
receiving a closing instruction corresponding to the pre-stored content address; and
playing the natural information stream in response to the closing instruction.

6. The method according to claim 4, wherein in response to determining that the control instruction is switching, the playing the natural information stream based on the control instruction comprises:
in response to the control instruction, closing the video content and switching to the natural information stream.

7. The method according to claim 4, wherein in response to determining that the control instruction is continuous playing, the playing the natural information stream based on the control instruction comprises:
in response to the control instruction, displaying the natural information stream after displaying the video content.

8. The method according to claim 3, wherein after the playing the natural information stream based on the control instruction, the method further comprises:
receiving a return instruction corresponding to the natural information stream, and
in response to the return instruction, closing the natural information stream and switching to the video content.

9. The method according to claim 3, wherein the playing the video content comprises:
displaying the video content according to a preset time parameter, a preset component configuration, and a preset animation effect.

10. The method according to claim 1, wherein before the reading preloaded video data, the method further comprises:
acquiring a preload task corresponding to the video content, wherein the preload task carries a preloading strategy, and the preloading strategy is used to limit a preset network parameter and a preset data parameter on the video content; and
requesting the preloaded video data and caching the preloaded video data according to the preset network parameter and the preset data parameter.

11. A client computing device, comprising:
a processor; and a memory storing instructions executable by the processor, wherein the processor, when executing the instructions, is configured to implement operations comprising:

detecting a current state parameter after a starting instruction is received, wherein the current state parameter comprises a data loading state indicating whether a client terminal has finished loading video data corresponding to the video content, a data invalidation state indicating whether the video data cached by the client terminal has expired, a display timing state indicating whether the client terminal is at a display timing, and an insertion state indicating whether the video content is allowed to insert into a natural information stream;

determining whether the current state parameter meets a preset display condition for displaying the video content;

reading preloaded video data in response to determining that the current state parameter meets the preset display condition, wherein the preset display condition is used to determine whether to display video content corresponding to the preloaded video data;

embedding the video content into the natural information stream to obtain information stream corresponding to a target video, wherein the target video comprises the natural information stream and the video content embedded in the natural information stream;

playing the target video in response to the starting instruction; and performing smooth transitions between the video content and the natural information stream while playing the target video, wherein the smooth transitions comprise switching from the video content to the natural information stream and switching from the natural information stream to the video content, and wherein the performing smooth transitions between the video content and the natural information stream while playing the target video further comprises switching between the video content and the natural information stream in response to receiving a swipe operation performed by a user.

12. The client computing device according to claim 11, wherein the operations further comprise:
acquiring at least one of a pre-stored simulation starting image or a pre-stored simulation starting video when receiving the starting instruction; and
displaying at least one of the pre-stored simulation starting image or the pre-stored simulation starting video in response to the starting instruction.

13. The client computing device according to claim 12, wherein the operations further comprise:
removing at least one of the pre-stored simulation starting image or the pre-stored simulation starting video;
playing the video content, and receiving a control instruction; and
playing the natural information stream based on the control instruction.

14. The client computing device according to claim 13, wherein the control instruction comprises: viewing, switching or continuous playing, and wherein the operations further comprise:
in response to determining that the control instruction is viewing, performing viewing processing according to a pre-stored content address corresponding to the video content, receiving a closing instruction corresponding to the pre-stored content address, and playing the natural information stream in response to the closing instruction;
in response to determining that the control instruction is switching, closing the video content and switching to the natural information stream in response to the control instruction; and
in response to determining that the control instruction is continuous playing, displaying the natural information stream in response to the control instruction after the video content is displayed.

15. The client computing device according to claim 13, wherein the operations further comprise:
receiving a return instruction corresponding to the natural information stream; and
closing the natural information stream and switching to the video content in response to the return instruction; and
displaying the video content according to a preset time parameter, a preset component configuration and a preset animation effect.

16. The client computing device according to claim 11, wherein the operations further comprise:
acquiring, before the preloaded video data is read, a preload task corresponding to the video content, wherein the preload task carries a preloading strategy, and the preloading strategy is used to limit a preset network parameter and a preset data parameter on the video content; and
requesting the preloaded video data and cache the preloaded video data according to the preset network parameter and the preset data parameter.

17. A non-transitory storage medium having a program stored thereon and applied to a client computing device, wherein the program, when executed by a processor, implements operations comprising:
detecting a current state parameter when receiving a starting instruction, wherein the current state parameter comprises a data loading state indicating whether a client terminal has finished loading video data corresponding to the video content, a data invalidation state indicating whether the video data cached by the client terminal has expired, a display timing state indicating whether the client terminal is at a display timing, and an insertion state indicating whether the video content is allowed to insert into a natural information stream;
determining whether the current state parameter meets a preset display condition for displaying the video content;
reading preloaded video data in response to determining that the current state parameter meets the preset display condition, wherein the preset display condition is used to determine whether to display the video content to be displayed corresponding to the preloaded video data;
embedding the video content into the natural information stream to obtain information stream corresponding to a target video, wherein the target video comprises the natural information stream and the video content embedded in the natural information stream;
in response to the starting instruction, playing the target video; and
performing smooth transitions between the video content and the natural information stream while playing the target video, wherein the smooth transitions comprise switching from the video content to the natural information stream and switching from the natural information stream to the video content, and wherein the performing smooth transitions between the video content and the natural information stream while playing the target video further comprises switching between the video content and the natural information stream in response to receiving a swipe operation performed by a user.

\* \* \* \* \*